J. R. INABNIT.
RESTRAINING DEVICE.
APPLICATION FILED APR. 2, 1913.
1,083,101.
Patented Dec. 30, 1913.
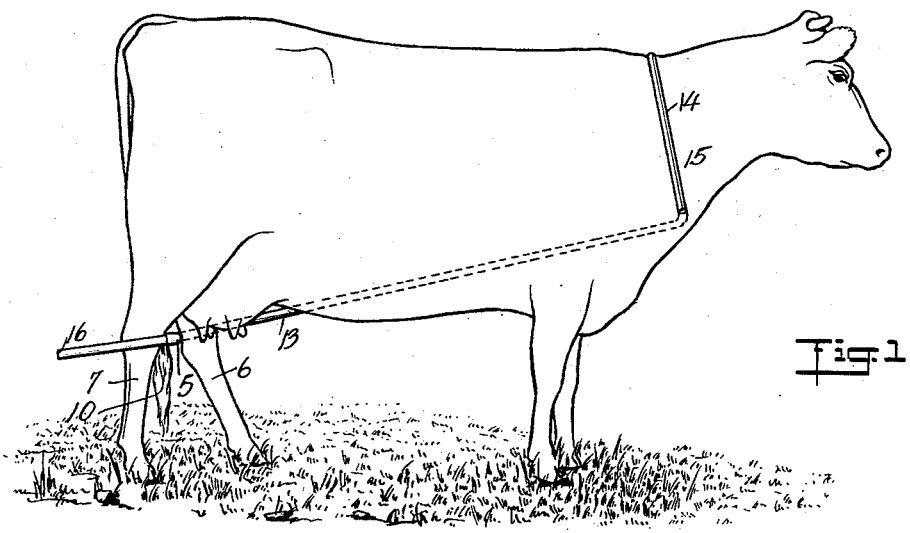
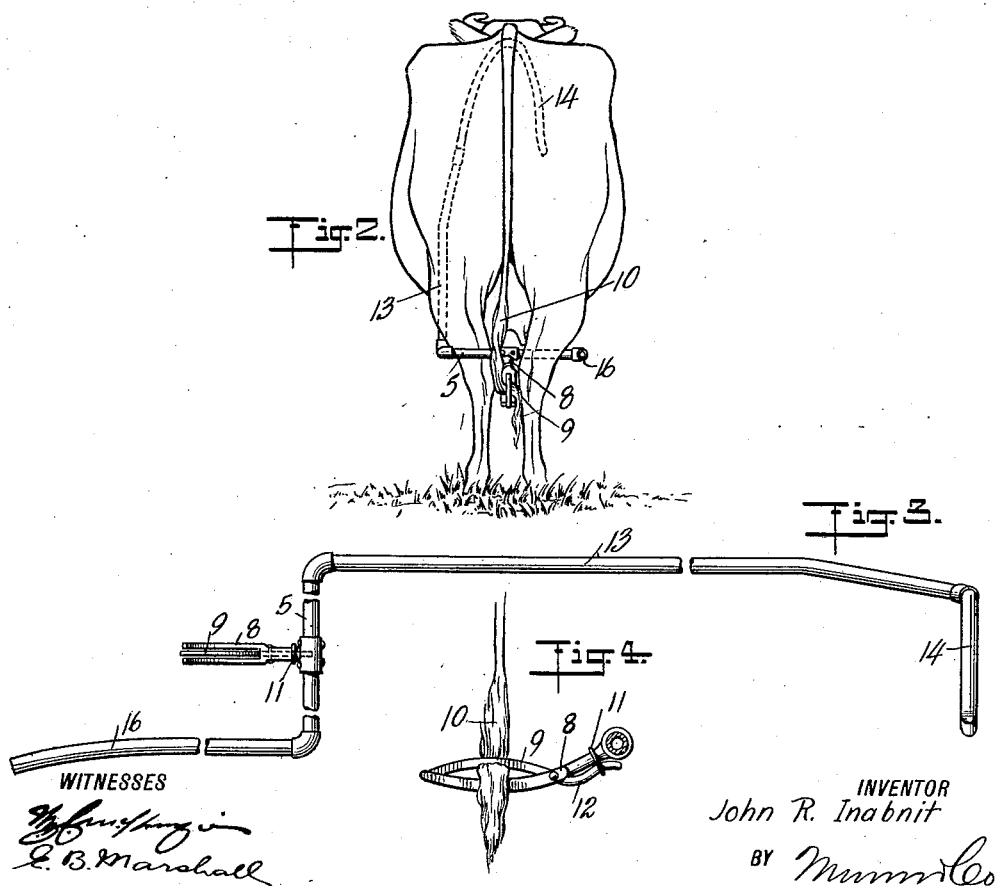
INVENTOR
John R. Inabnit
BY
ATTORNEYS
WITNESSES

UNITED STATES PATENT OFFICE.

JOHN RILEY INABNIT, OF SEDAN, MONTANA.

RESTRAINING DEVICE.

1,083,101. Specification of Letters Patent. Patented Dec. 30, 1913.

Application filed April 2, 1913. Serial No. 758,334.

*To all whom it may concern:*

Be it known that I, JOHN RILEY INABNIT, a citizen of the United States, and a resident of Sedan, in the county of Gallatin and State of Montana, have invented a new and Improved Restraining Device, of which the following is a full, clear, and exact description.

My invention has for its object to provide a device which may be readily adjusted on a cow, and which will prevent the cow from moving her hind legs or tail in such a way as might interfere with the operation of milking. The device is of especial value for use on young cows.

The device is constructed of a transverse member which is normally disposed in front of the hind leg of a cow on the side at which the milker operates, the transverse member being disposed behind the hind leg at the other side of the cow. The transverse member has at the last-mentioned side of the cow, a longitudinally extending portion, which has a curved terminal, which is normally disposed over the cow's neck. It will be seen that the transverse member will hold the cow's legs in the best position for milking. This transverse member has a clamp for holding the cow's tail, the clamp also serving to support the transverse member at the proper height.

Additional objects of the invention will appear in the following complete description, in which the preferred form of the invention is disclosed.

In the drawings similar characters of reference indicate corresponding parts in all the views, in which—

Figure 1 is a side elevation of a cow showing how my device is mounted thereon; Fig. 2 is a rear elevation of the cow with the milking device as shown in Fig. 1; Fig. 3 is a plan view of the milking device; and Fig. 4 is a fragmentary view partially in section, showing the means for clamping the cow's tail.

By referring to the drawings it will be seen that the device is constructed with the transverse member 5, which is disposed behind one of the cow's hind legs 6, and in front of the cow's other hind leg 7, this transverse member 5 having secured thereto a clamping member 8, to which is pivoted a second clamping member 9, the clamping members 8 and 9 coöperating to secure the cow's tail 10. It will be understood that not only will the transverse member 5 be supported by the engagement of the clamping members 8 and 9 with the cow's tail, but in this way the cow will be prevented from moving her tail in such a way as to interfere with the milking process. The clamping member 9 is held in position relatively to the clamping member 8, by a ring 11, which is disposed around the shank of the clamping member and is adapted to engage the handle portion 12 of the clamping member 9. At the outer side of the cow's leg 6, the transverse member 5 has a longitudinally extending portion 13, the terminal 14 of which is curved, and which is normally disposed over the cow's neck 15, this longitudinally extending portion 13 also preventing the cow from moving her leg 6 outward. The transverse member 5 also has at its other side a rearwardly extending portion 16, which serves to prevent the cow from moving her other hind leg 7 outwardly.

It will be seen that the device is supported by the curved terminal 14, which is disposed over the cow's neck 15, and that at the rear the device is supported by the engagement of the clamping members 8 and 9 with the cow's tail 10. The tail clamps 8 and 9 may be adjustable on the cow's tail 10, so as to hold the transverse member at the proper height.

As will be readily understood the device may be made in any desired size and of any suitable material.

The device may be put on a cow in an instant, and may be as readily removed.

Having thus described my invention I claim as new and desire to secure by Letters Patent:

1. In a restraining device a transverse member adapted to normally engage a cow's rear leg, the transverse member having a forwardly extending portion at one end thereof, and a rearwardly extending portion at the other end thereof, and means for holding the member in position on the cow.

2. In a restraining device, a transverse member adapted to normally engage the hind legs of a cow, the transverse member having a longitudinally extending portion at one end thereof to prevent the lateral movement of the cow's hind legs, securing means for holding the cow in position, and tail securing means on the member.

3. In a restraining device, a transverse member adapted to be normally disposed between the hind legs of a cow, the member having a forwardly extending portion at one end thereof, with a curved terminal adapted to be disposed over the neck of the cow, and a rearwardly extending portion at the other end thereof.

4. In a restraining device, a transverse member adapted to be normally disposed between the hind legs of a cow, the member having a forwardly extending portion at one end thereof, with a curved terminal normally disposed over the neck of the cow, the transverse member having a rearwardly extending portion at the other end of the transverse member, and tail securing means on the transverse member.

In testimony whereof I have signed my name to this specification in the presence of two subscribing witnesses.

JOHN RILEY INABNIT.

Witnesses:
E. T. GRUWELL,
HUGH C. GRUWELL.

Copies of this patent may be obtained for five cents each, by addressing the "Commissioner of Patents, Washington, D. C."